US006395663B1

(12) United States Patent
Chen et al.

(10) Patent No.: US 6,395,663 B1
(45) Date of Patent: May 28, 2002

(54) LOW TEMPERATURE SINTERED BI$_2$O$_3$-ZNO-NB$_2$O$_5$ CERAMICS AND METHOD FOR ITS FORMATION

(75) Inventors: San-Yuan Chen, Hsinchu; Yih-Jaw Lin, Nan tou, both of (TW)

(73) Assignee: National Science Council, Taipei (TW)

( * ) Notice: Subject to any disclaimer, the term of this patent is extended or adjusted under 35 U.S.C. 154(b) by 0 days.

(21) Appl. No.: 09/595,812

(22) Filed: Jun. 16, 2000

(51) Int. Cl.$^7$ ...................... C07B 35/453; C07B 35/495
(52) U.S. Cl. ........................................ 501/134; 501/135
(58) Field of Search ................................. 501/134, 135

(56) References Cited

U.S. PATENT DOCUMENTS

| | | | |
|---|---|---|---|
| 3,656,984 A | 4/1972 | Hoffman | 106/53 |
| 4,504,339 A | 3/1985 | Koichi et al. | 156/89 |
| 4,638,401 A | * 1/1987 | Ling et al. | 361/321 |
| 5,433,917 A | 7/1995 | Srivastava et al. | 419/22 |
| 5,449,652 A | 9/1995 | Swartz et al. | 501/134 |

FOREIGN PATENT DOCUMENTS

| | | | | |
|---|---|---|---|---|
| CA | 1218779 | * | 6/1999 | |
| EP | 0558319 | | 9/1993 | ......... C04B/35/497 |
| JP | 63025264 | * | 2/1988 | |

OTHER PUBLICATIONS

"Microwave Characteristics of (Zr, Sn) TiO$_4$ and BaO–PbO–Nd$_2$O$_3$–TiO$_2$ Dielectric Resonators," K. Wakino, K. Minai and H. Tamura, Murata Manfacturing Co., Ltd., 2–26–10 Tenjin, Nagaokakyo–shi, Kyoto 617, Japan; published in the *Journal of the American Ceramic Society*, vol. 67, No. 4.

"Microwave Dielectric Properties and Characteristics of Polar Lattice Vibrations for Ba(Mg$_{1/3}$Ta$_{2/3}$)O$_3$–A(Mg$_{1/2}$W$_{1/2}$)O$_3$(A=Ba, Sr, and CA) Ceramics," published in the Jan. 15, 1999 Journal of Applied Physics, vol. 85, No. 2.

"Microwave Dielectric Properties of )Ba, Sr)O–Sm$_2$O$_3$–TiO$_2$ Ceramics," Susumu Nishigaki, Hiroshi Kato,Shinsuke Yano, and Rikiya Kamimura, Narumi China Corp., Narumi Technical Lab, 3 Kenjiyama, Narumi–cho, Midori–ku, Nigoya 458, Japan, published in Ceramic Bulletin, vol. 66, No. 9, 1987 No month.

"Effect of Glass Additions on BaO–TiO$_2$WO$_3$ Microwave Ceramics," Takahiro Takada, Sea Fue Wang, Shoko Yoshikawa, Sei–Joo Jang and Robert E. Newnham, Materials Research Laboratory, The Pennsylvania State University, University Park, Pennysylvania 16802, published in J. Am. Ceram Soc. 77171 1909–16 (1994) No month.

Materials Compatibility and Cosintering Aspects of Shrinkage Control in Low–Temperature Confired Ceramic Packages, H.T. Sawhill, Electronics Department—Research and Development Div., E.I.du Pont de Nemours & Co., Inc., Experimental Station, Wilmington, DE 1989 No month.

Phase Structure and Dielectric Properties of BI$_2$O$_3$–Nb2O5–Based Dielectric Ceramics, Donhang Liu, Yi Liu, Shui–Q. Huang, and Xi Yao, Department of Electronic Engineering, Xi'an Jiaotong University, Xi'an, 710049 People's Republica of China, J. Am. Ceram. 76 (8) 2129–32 (1993) No month.

"Low–Firing, Temperature–Stable Dielectric Compositions Based on Bismuth Nickel Zinc Niobates," Man G. Yan, Hung C. Ling, and Warren W. Rhodes, AT&T Bell Laboratories, Murray Hill, New Jersey 07974 and Princeton, New Jersey 08540, J. Am. Ceram. 73 (4) 1106–107 (1990) No month.

"High Dielectric Constant and Small Temperature Coefficient Bismuth–Based Dielectric Compositions," H.C. Ling, AT&T Bell Laboratories, Princeton, New Jersey 08540, M.F. Yan and W.W. Rhodes, AT&T Bell Laboratories, Murray Hill, New Jersey 07974, J. Mater. Res. vol. 5, No. 8, Aug. 1990, ©1990 Materials Research Society.

* cited by examiner

*Primary Examiner*—Karl Group
(74) *Attorney, Agent, or Firm*—Gardere Wynne Sewell LLP; Sanford E. Warren, Jr.; Matthew E. Burr

(57) ABSTRACT

A dielectric ceramic material is provided. The ceramic material includes a mixture represented by the formula of $Bi_{2-x}(Zn_{2/3}Nb_{4/3})O_{7-3x/2}$ (BZN), $0 \leq x \leq 0.67$, and a flux having an eutectic composition for lowering the sintering temperature of the mixture from 950~1100° C. to 800~850° C. The dielectric material has a dielectric constant larger than 45 ($\epsilon_r > 45$) and a quality factor larger than 1200 (or $Q \cdot f > 4500$) at 3.5 GHz.

7 Claims, 15 Drawing Sheets

Fig. 1 X-ray diffraction (XRD) of (a) pseudo-tetragonal phase (T-BZN) and (b) cubic (C-BZN) pyrochlore phase Fig. 2 Thermomechanical analysis (TMA) of T-BZN ceramics

LOW TEMPERATURE SINTERED Bi₂O₃-ZNO-Nb₂O₅ CERAMICS AND METHOD FOR ITS FORMATION

FIELD OF THE INVENTION

The present invention relates to a $Bi_2O_3$—$ZnO$—$Nb_2O_5$ (BZN) ceramic material, and especially to a BZN ceramic material having a low sintering temperature by adding a flux therein.

BACKGROUND OF THE INVENTION

Microwave ceramic materials in the microwave frequency, f, ranged from 1 to 12 GHz are used as dielectric resonators, e.g. bandpass or bandstop filters and oscillator stabilizer devices. These devices are becoming increasingly important with the continued development of microwave integrated circuitry, microwave telecommunications, and satellite broadcasting systems.

$BaO$—$RE_2O_3$—$TiO_2$ is one system of ceramic materials being developed for microwave applications, wherein $RE_2O_3$ is a rare earth oxide, e.g. $La_2O_3$, $Nd_2O_3$, $Sm_2O_3$, etc. See for example: (1) Journal of the American Ceramic Society, K. Wakino, et al., 67(4), 1984, pp.278–281 and (2) Am. Ceram. Soc. Bull., S. Nishigaki, 66(9), 1987, pp.1405–1410. These ceramic materials have high dielectric constant ($\in_r \approx 70$~$90$) and low temperature resonant coefficient ($\tau_f < 10$ ppm/° C.). $BaO$—$MgO$—$Ta_2O_5$ is another ceramic material system being developed. This ceramic material has high dielectric loss quality (Q·f≈150000). See for example: J. Appl. Phys., M. Furuya, 85(2), 1084 (1999). Although these ceramic materials have excellent microwave dielectric characteristics, they need to be densified at a higher sintering temperature above 1300° C. Therefore, the processes for manufacturing the electronic devices need to be further modified. In order to avoid resonance interference and dielectric loss, the electrodes used in the multilayer structure should exhibit a high conductivity. Although Ag-based internal electrode is the best choice, the melting point of Ag is quite low ($T_m$=961° C.). If the sintering temperature of the ceramic materials is too high, Ag-based internal electrode can not be utilized. Therefore, the point of present invention is to provide a low-temperature cofired ceramic material with good microwave properties.

PRIOR ARTS

The reports of recent researches for lowering the sintering temperature of the ceramics can be divided as follows:

(I) A first method to lower the sintering temperature of microwave ceramics such as $BaO$—$RE_2O_3$—$TiO_2$ from 1300° C. to 950° C. is done by adding a lot of glass phases (10 wt %~30 wt %) inside. However, adding glass phases will lower the dielectric constant from 90 to 20. Moreover, the sintering temperature (950° C.) is not low enough for the low-temperature cofired ceramic (LTCC) applications. See for example: (1) U.S. Pat. No. 4,504,339 and (2) Journal of The American Ceramic Society, T. Takada, 77(7), 1994, pp.1909–1916.

(II) A second method to lower the sintering temperature of microwave ceramics is made by using a glassy-phased dielectric ceramics, which is formed by melting all oxides and then quick cooling the mixture. The sintering temperature can be lowered to 850° C. but the dielectric constant is only 7~13. See for example: (1) U.S. Pat. No. 3,656,984 and (2) "Materials Compatibility and Cosintering Aspects of Shrinkage Control in Low-Temperature Cofired Ceramic Packages, H. Sawhill, pp.307–319, Advanced in Ceramics, Vol. 26, "*Ceramic Substrates and Packages for Electronic Applications*" (American Ceramic Society, Westerville, Ohio, 1990).

(III) As disclosed in U.S. Pat. No. 5,449,652, a new dielectric ceramic material, $Bi_2O_3$—$ZnO$—$Nb_2O_5$ (or $Bi_{2-x}(Zn_{2/3}Nb_{4/3})O_{7-3x/2}$, $0 \leq x \leq 0.67$, BZN), is evolved. By improving the composition and forming method, the sintering temperature of BZN ceramics is lowered to 920° C. and the microwave dielectric properties is excellent [$\in_r \approx 75$·140, Q·f>5000 (at 1~5 GHz)]. See for example: (1) "Phase Structure and Dielectric Properties of $Bi_2O_3$—$ZnO$—$Nb_2O_5$-based Dielectric Ceramics", D. Liu, et al., J. Am. Ceram. Soc., 76(8), 1995,pp.2129–2132, and (2) J. Am. Ceram. Soc., M. F. Yan, et al., 73(4), 1987, pp.1106–1107. (3) J. Mater. Res. 5, 1990, pp. 1752–1762. Although there are many developments done to modify BZN, the sintering temperatures of BZN ceramics in the conventional researches are all above 900° C. and most of the dielectric properties were measured at a frequency below 10 MHz.

The reports for the dielectric properties of BZN ceramics at a high frequency in the GHz range are still not too much. European Patent No.558319A discloses that after the $xBiO_{1.5-y}ZnO_zNbO_{2.5}$, wherein 0.41<x<0.51, 0.19<y<0.3, and 0.25<z<0.345, is sintered at 925° C., the dielectric properties at 2~4 GHz are $\in_r$=89~133, Q=40~310, and $\tau_f$=110~120 ppm/° C. Others try to improve the sintering temperature of BZN by replacing a small amount of Bi, Zn, and Nb elements (usually less than 20%) with Ca, Mg, Co, Sn, Ti, etc. or changing the manufacturing method of BZN. As an example disclosed in U.S. Pat. No. 5,449,652, by mixing ZnO and $Nb_2O_5$ to form $ZnNb_2O_6$ at first and sintering $ZnNb_2O_6$ with $Bi_2O_3$, ZnO, and $CaCO_3$ at 950~1100° C., BZN ceramics can be formed with the dielectric properties of $\in_r$=90~110, $f_r$<100 ppm/° C., tan δ(at 100 KHz)<0.0002, Q·f(at 1·5 GHz)>5000. Although BZN is an excellent low-temperature microwave ceramic material, the sintering temperature still has to be over 925° C.

In order to lower sintering temperature, many fluxes, such as $Li_2CO_3$, $B_2O_3$, LiF, PbO and CuO, are added. See for example: U.S. Pat. No. 5,433,917 "PZT Ceramic compositions having reduced sintering temperatures and process for producing same". Unfortunately, although these fluxes can be added in $BaTiO_3$ or piezoelectric ceramics (PZT), they can not be added in BZN systems since the dielectric properties will be significantly affected.

It is therefore attempted by the applicant to develop a novel fluxed BZN dielectric ceramic materials having sintering temperature below 900 to overcome the aforementioned limitations and difficulties encountered with the prior art. Additionally, excellent microwave properties, i.e., Q (quality factor) and ∈ (dielectric constant) can be obtained at such a low sintering temperature as 800~850° C.

SUMMARY OF THE INVENTION

It is an object of the present invention to provide a dielectric ceramic material which is mainly made by $Bi_2O_3$—$ZnO$—$Nb_2O_5$ (BZN). By adding a special flux in BZN, the sintering temperature is lowered and the dielectric properties still maintain excellent.

It is another object of the present invention to provide a method for forming a dielectric ceramic material by adding a flux. The flux is formed by mixing and melting the mixture oxides according to the eutectic composition of the oxides.

It is a further object of the present invention to provide a dielectric ceramic material which is formed by directly mixing, calcining and sintering $Bi_2O_3$, ZnO and $Nb_2O_5$ or by directly mixing, calcining and sintering $Bi(CH_3COO)_3$, $Zn(CH_3COO)_2$ and $Nb(OC_2H_5)_5$.

The dielectric ceramic material of the present invention includes a mixture represented by the formula of $Bi_{2-x}(Zn_{2/3}Nb_{4/3})O_{7-3x/2}$ (BZN), $0 \leq x \leq 0.67$, and a flux having an eutectic composition for lowering the sintering temperature of the dielectric ceramics from 950~1100° C. to 800~850° C.

According to the present invention, the dielectric material has a dielectric constant higher than 45 ($\in_r > 45$) and a quality factor larger than 1200 (Q·f>4500) at 3.5 GHz.

The fluxes used in the present invention include $BaCO_3$—2.5CuO powder and $0.15CuO$—$0.85MoO_3$ powders melted at about 1200° C., 900° C.

According to the present invention, the flux is added into the mixture with the addition of 0.1·10 wt %, preferably 0.5·5 wt %.

According to the present invention, BZN is formed from $Bi_2O_3$, ZnO, $Nb_2O_5$ calcined at 850° C., or from $Bi(CH_3COO)_3$, $Zn(CH_3COO)_2$, and $Nb(OC_2H_5)_5$ by a sol-gel method.

The method of forming a dielectric ceramic material includes (a) preparing a mixture represented by the formula of $Bi_{2-x}(Zn_{2/3}Nb_{4/3})O_{7-3x/2}$(BZN), $0 \leq x \leq 0.6$, (c) sintering the mixture at 850° C. to obtain the dielectric ceramic material.

The present invention may best be understood through the following description with reference to the accompanying drawings, in which:

DETAILED DESCRIPTION OF THE PREFERRED EMBODIMENTS

The present invention provides a ceramic material based on $Bi_2O_3$—ZnO—$Nb_2O_5$ (BZN) compositions which could be used for low-temperature cofired microwave ceramics. By adding a special flux in BZN ceramics, the sintering temperature is lowered and the excellent dielectric properties still maintains. The flux used in BZN of the present invention is an eutectic mixture of CuO and an oxide of alkaline or rear earth metal with lower eutectic temperature below 900° C., preferably CuO—$BaCO_3$ and CuO—$MoO_3$. By adding fluxes, the sintering temperature of BZN can be lowered from 950~1000° C. to 800~850° C. and the excellent microwave dielectric properties are maintained ($\in_r$=35~55, Q·f=5000).

The fluxes are formed according to the traditional ceramic processing. The compositions of fluxes are prepared according to the eutectic compositions, e.g. $BaCO_3$—2.5CuO and 0.15CuO—$0.85MoO_3$. After ball milling and drying, the mixture powder of $BaCO_3$—2.5CuO was melted at 1200° C. for 2 hrs and then fast cooled in water; the temperature used for the mixture powder of 0.15CuO—$0.85MoO_3$ was 900° C. for 2 hrs. Thus the fluxes are formed. The amount of additive plays an important role on the microwave dielectric properties of BZN. For $BaCO_3$—2.5CuO flux, the best amount of additive is 0.5~1 wt %. For 0.15CuO—$0.85MoO_3$, the amount of additive is preferably ranged from 0.5 wt % to 2 wt %.

The composition of the microwave ceramics used in the present invention is $xBiO_{1.5}$—yZnO—$zNbO_{2.5}$ (BZN). According to the report of Swartz et al., the crystal structure of BZN includes two major types: one is pseudo-tetragonal phase $Bi_2(Zn_{1/3}Nb_{2/4})_2O_7$ (so called T-BZN), and the other is cubic-pyrochlore $Bi_{4/3}(Zn_{2/3}Nb_{4/3})O_6$ (so called C-BZN). T-BZN has a lower sintering temperature (990~1000° C.), and the dielectric properties are also lower ($\in_r$=80, $\tau_f$=+200 ppm/° C.). C-BZN has a higher sintering temperature (1100° C.), and the dielectric properties are also higher ($\in_r$=145, $\tau_f$=-360 ppm/° C.).

Figure 1:
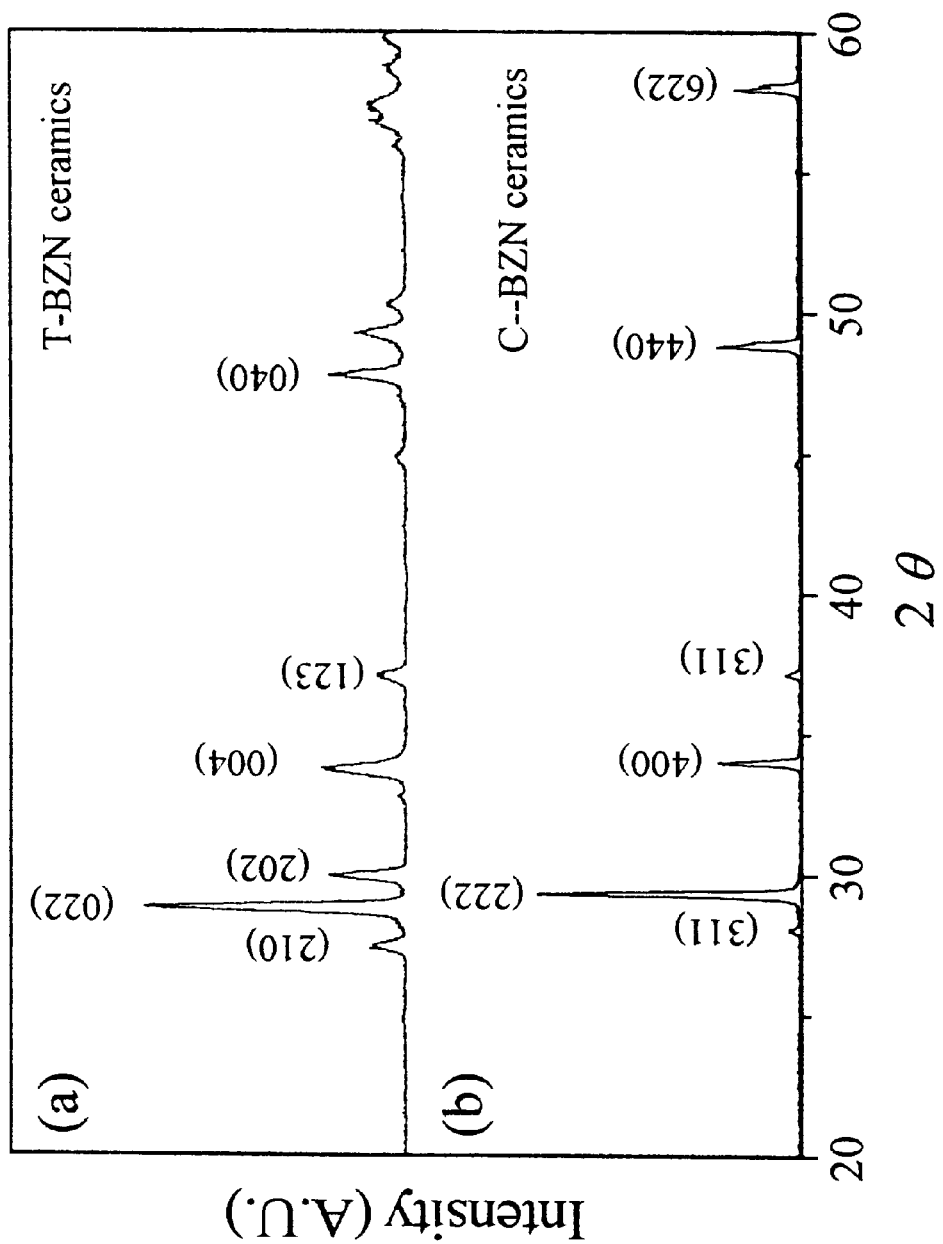
FIG. 1 are X-ray diffraction (XRD) patterns of (a) pseudo-tetragonal phase BZN (T-BZN) and (b) cubic-pyrochlore BZN (C-BZN)

The discussion of present invention will basically focus on T-BZN because the sintering temperature is lower and it is easier to be densified, but C-BZN will also be discussed. High-purity $Bi_2O_3$, ZnO and $Nb_2O_5$ were used as starting materials to synthesize BZN phase by a conventional powder-processing technique. The oxide powders were mixed in deionized water with $ZrO_2$ as milling media in polyethylene container. The dried powders were further calcined in air at 850° C. for 1 h to form BZN crystalline structure as confirmed with X-ray diffractometer. The X-ray diffraction (XRD) patterns of (a) T-BZN and (b) C-BZN are shown in FIG. 1.

Figure 2:
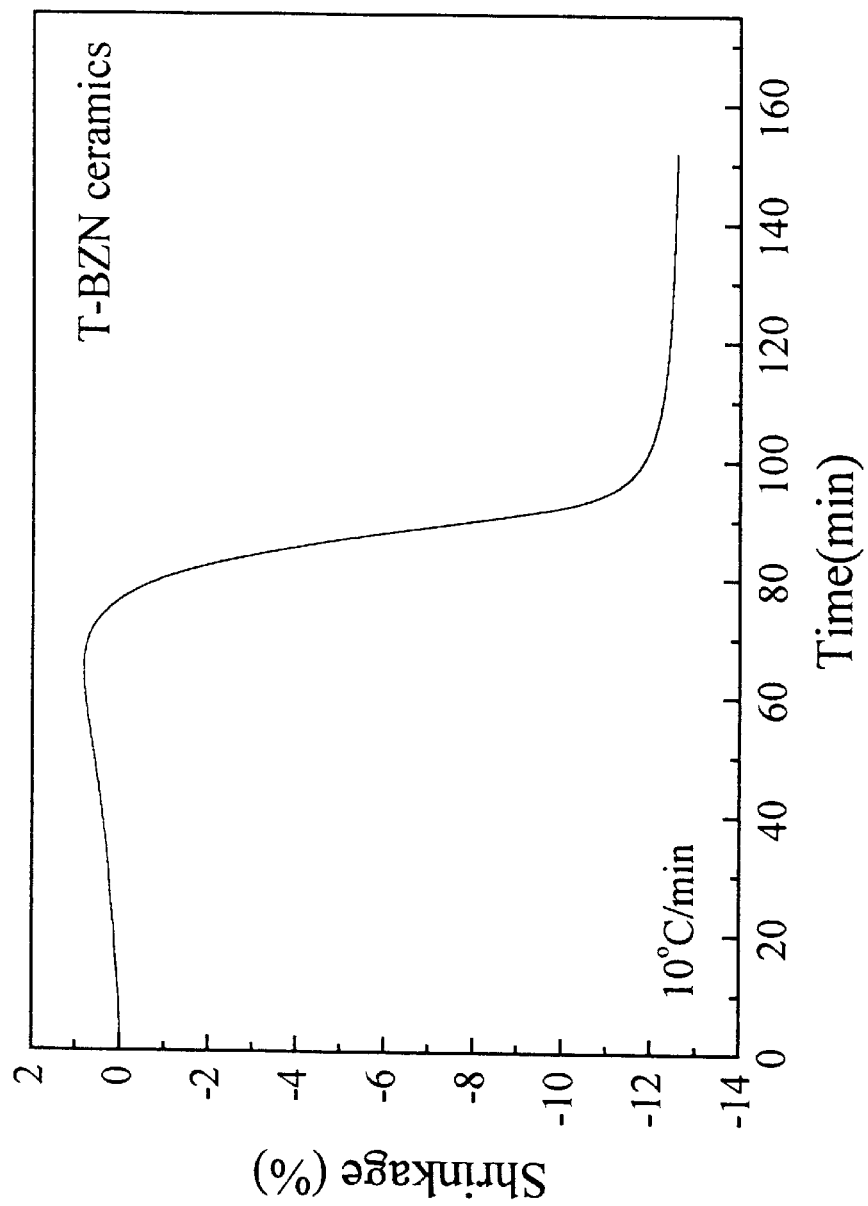
FIG. 2 is a plot showing the thermal shrinkage of T-BZN ceramics at a heating rate of 10° C./min.

FIG. 2 shows the thermal shrinkage of T-BZN ceramics measured with a thermomechanical analyzer (TMA). As shown in FIG. 2, the densification process starts at about 800° C., and with increasing sintering temperature, the densification of T-BZN increases. The complete densification occurs at 1000° C., where the total shrinkage is about 12% of the initial sample.

Figure 3:
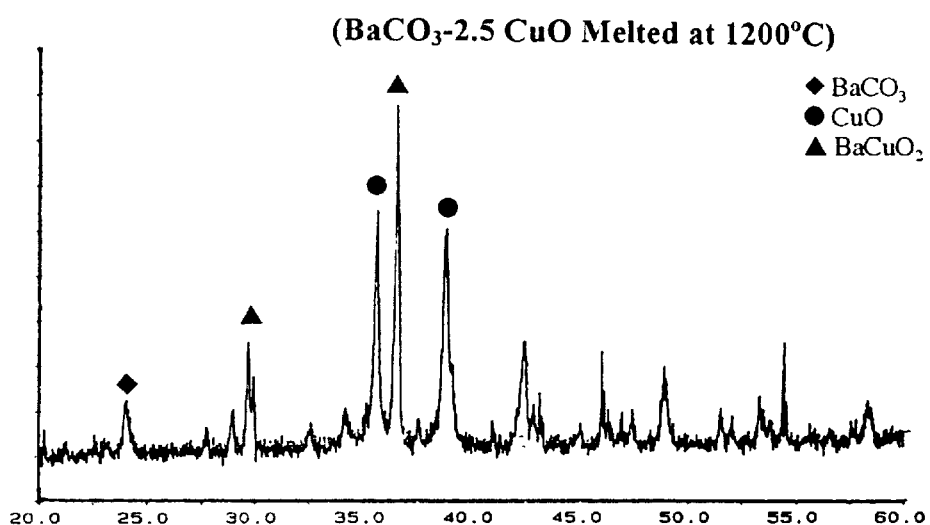
FIG. 3 shows the XRD patterns of $BaCO_3$—2.5CuO (BC) flux; melted at 1200° C. . The flux is mainly composed of $BaCuO_2$ and CuO.
Figure 4:
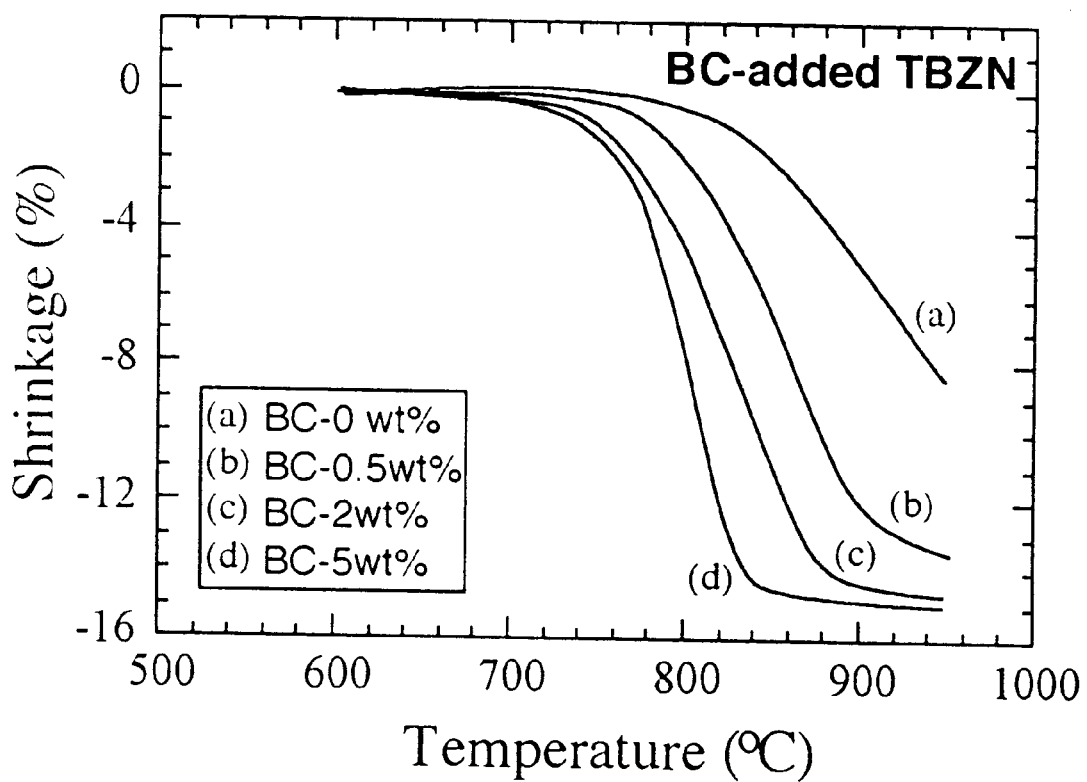
FIG. 4 is a plot showing the thermal shrinkage of T-BZN ceramics added with different amount of $BaCO_3$—2.5CuO (BC) flux.
Figure 5:
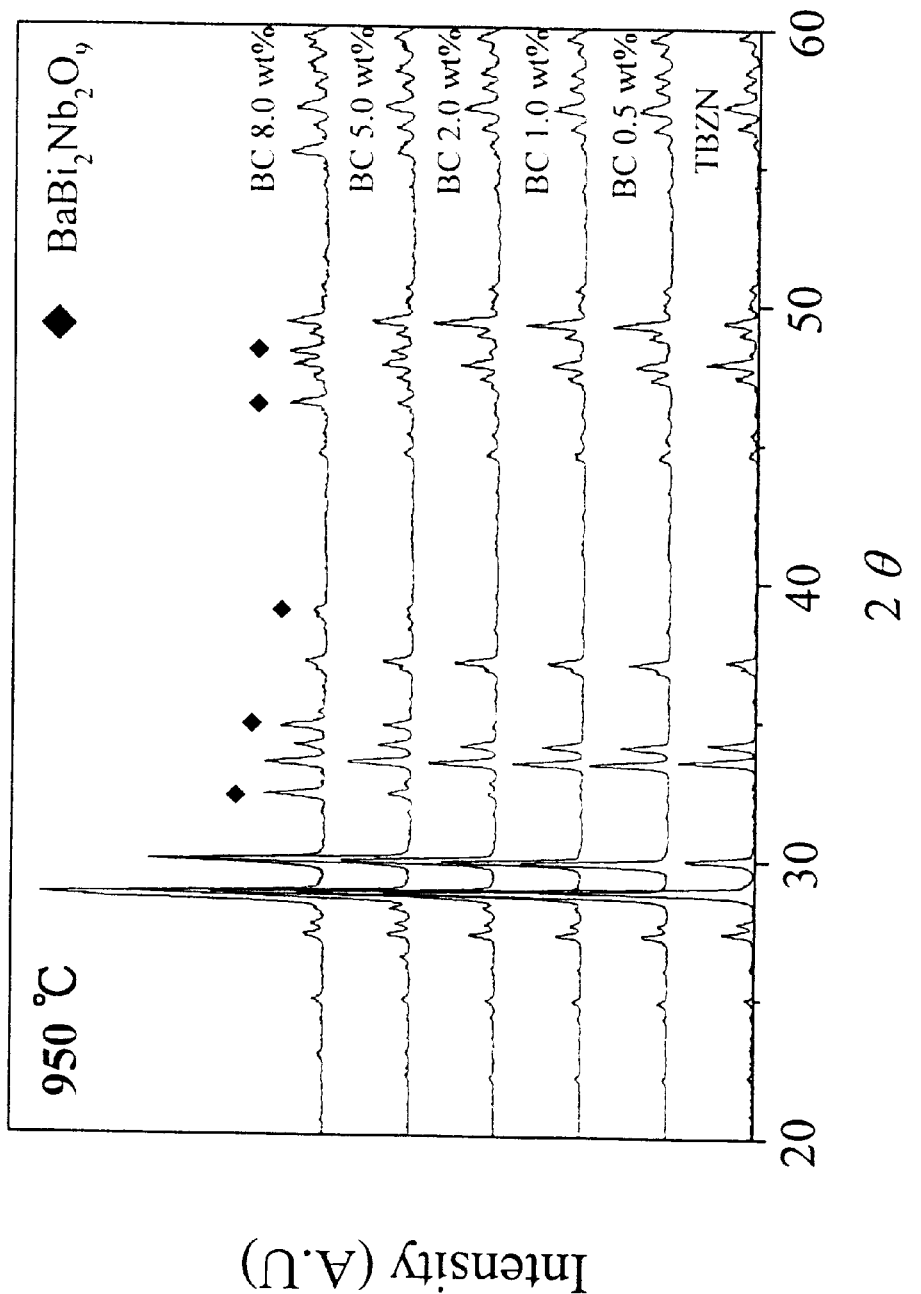
FIG. 5 are XRD patterns of T-BZN ceramics added with different amount of $BaCO_3$—2.5CuO flux at 0.0 wt % ~5.0 wt %.
Figure 6:
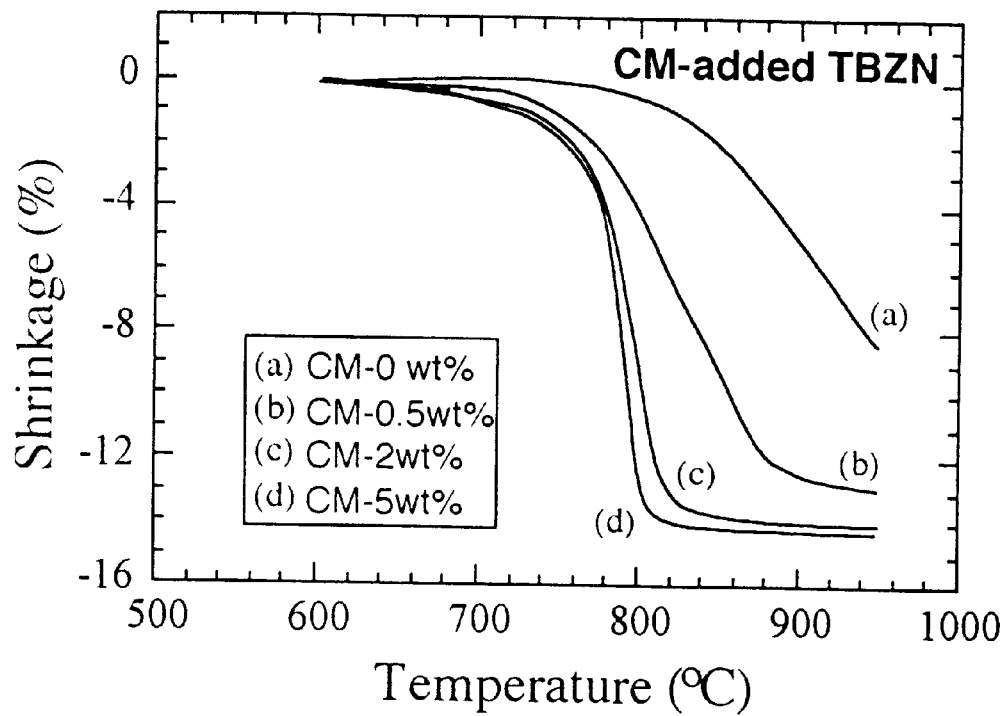
FIG. 6 is a plot showing the thermal shrinkage of T-BZN ceramics added with different amount of 0.15CuO—$0.85MoO_3$ (CM) flux at 0.0 wt %~5.0 wt %.
Figure 7:
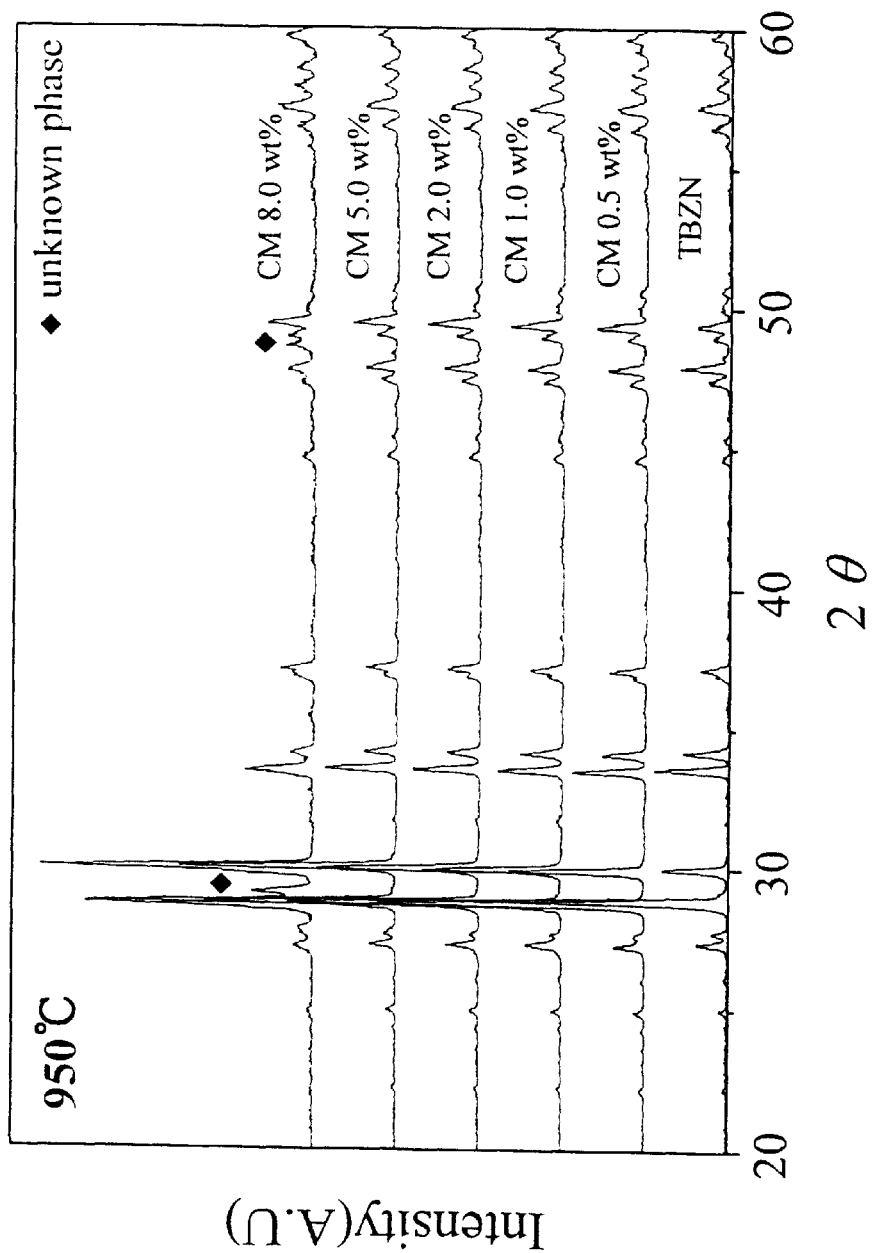
FIG. 7 are XRD patterns of T-BZN ceramics added with different amount of 0.15CuO—$0.85MoO_3$ flux at 0.0 wt %~8.0 wt %.

The CuO-based flux was made by mixing and then melting the mixture powder at a high temperature. For example, $BaCO_3$—2.5CuO mixture powder was melted at 1200° C. and fast quenched into water. A mixture of $BaCuO_2$ and CuO phases were identified as shown in FIG. 3. The XRD pattern showeffect of $BaCO_3$—2.5CuO (BC) and 0.15CuO—0.85$MoO_3$ (CM) fluxes on the thermal shrinkage and phase crystalline of T-BZN are shown in FIGS. 4 and 7, respectively. FIG. 4 shows that the addition of BC flux will affect the densification process of T-BZN ceramics. When the amount of BC additive is 0.5 wt %, the densification process starts at 780° C. and ends around 950° C., where the total shrinkage is about 13.4% of the initial sample. When the amount of BC additive is 5 wt %, the densification process starts at 720° C. and reaches the final total shrinkage (14.9% of the initial sample) at around 845° C. From XRD analysis (FIG. 5), some secondary phase was observed at the compositions with BC flux above 2 wt % as the samples were sintered at 950° C. With respect to the effect of CM flux, as shown in FIG. 6, it was found that the densification effect of CM was much better than that of BC and thus could be densified at a lower temperature. For example, with 2 wt % CM flux added, the T-BZN ceramics starts to shrink at 675° C. and reaches a complete densification at 800~825° C. In addition, similar results were observed for 5 wt % CM-added T-BZN ceramics and does not show many differences. That is to say, the applicable range of CM flux is larger than that of BC flux. However, similar to FIG. 5, same phenomena are also observed in T-BZN added with CM flux more than 5 wt % (i.e., 8 wt %). XRD analysis in FIG. 7 shows that extra phases will be generated.

Figure 8:
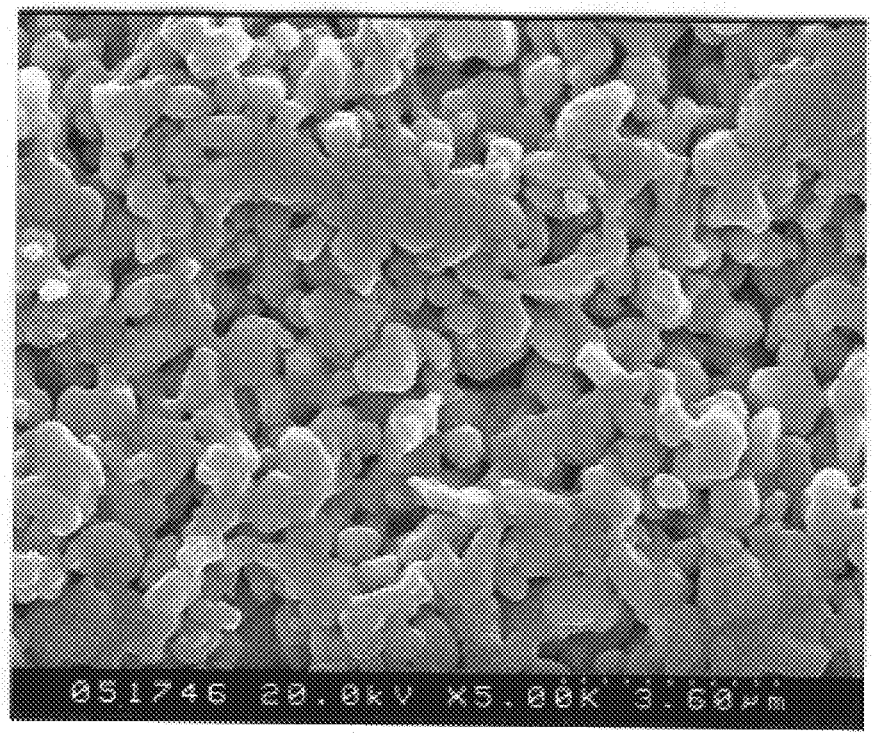
FIG. 8 is the SEM microstructure of T-BZN ceramics, sintered at 800° C. in air for 1 hour.
Figure 9:
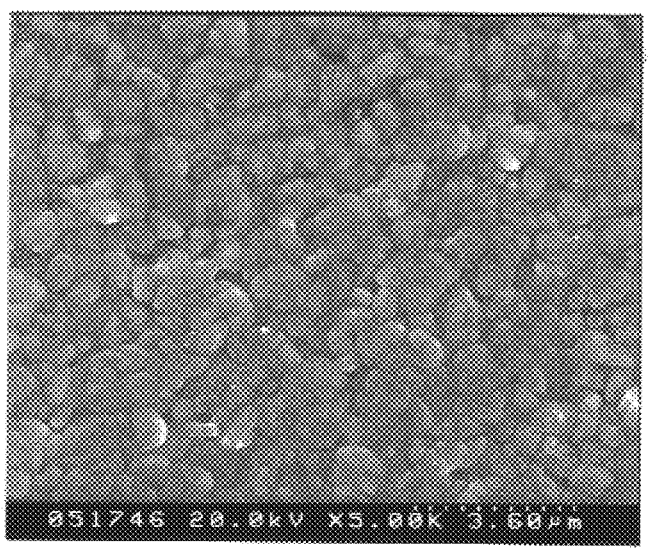
FIG. 9 is the SEM microstructure of T-BZN ceramics added with (a) 1.0 wt % and (b) 5.0 wt % 0.15CuO—$0.85MoO_3$ (CM) sintered at 800° C. in air for 1 hour.
Figure 9:
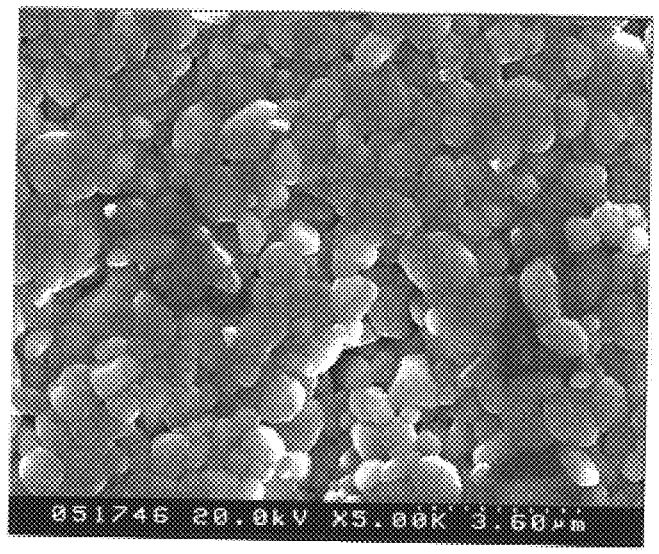
Figure 10:
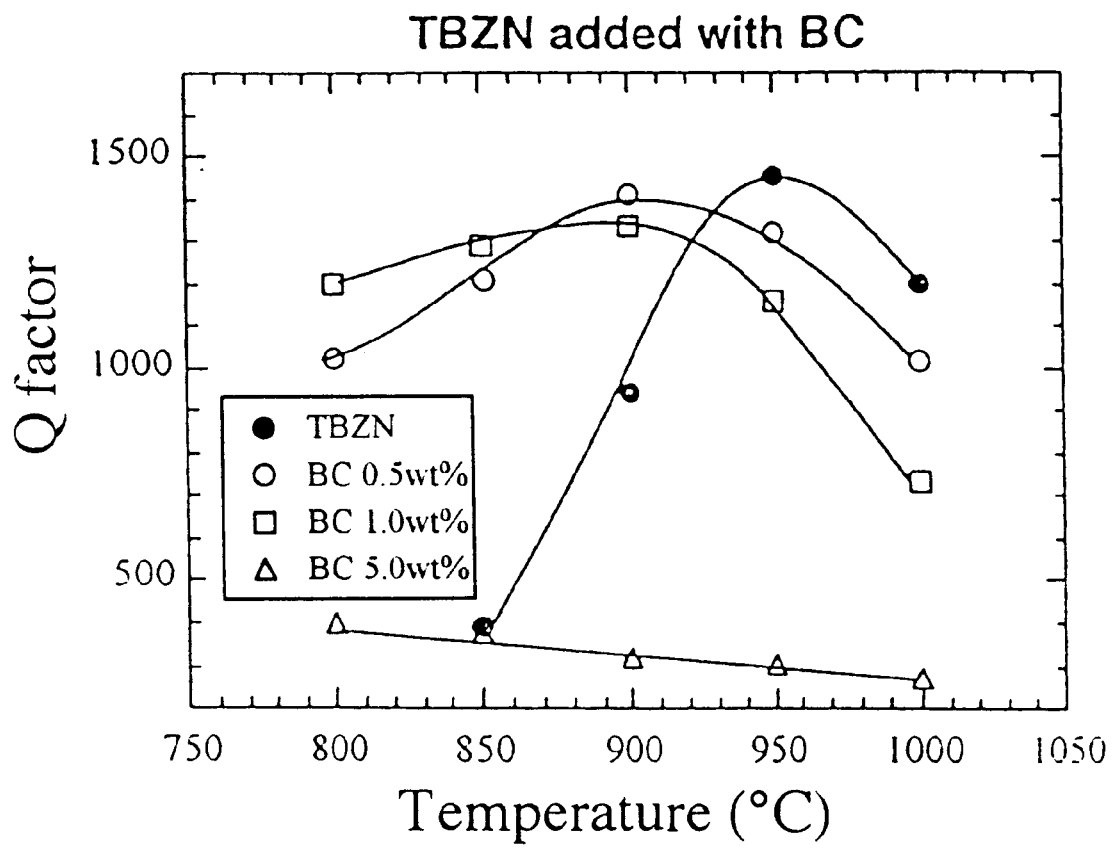
FIG. 10 is a plot showing the dependence of Q factor on sintering temperature for T-BZN added with different amount of $BaCO_3$—2.5CuO (BC)
Figure 11:
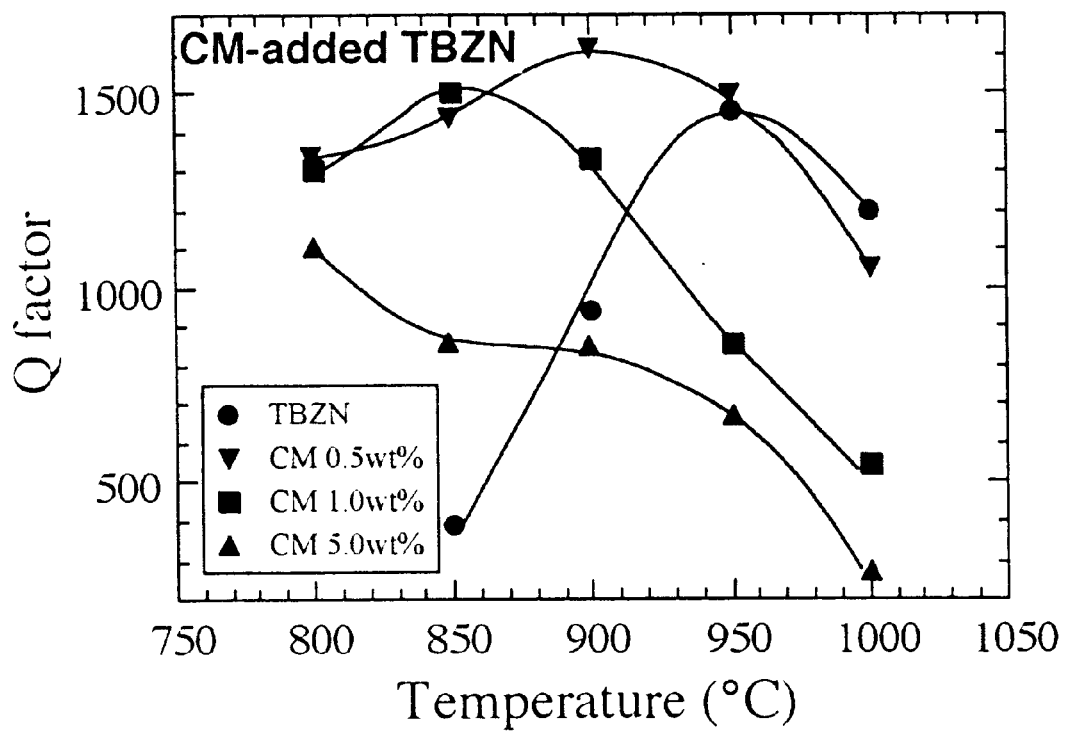
FIG. 11 is a plot showing the dependence of Q factor on sintering temperature for T-BZN added with different amount of 0.15CuO—$0.85MoO_3$ (CM)

From microstructure observation shown in FIG. 8, T-BZN ceramics present a loose and porous structure after sintering at 800° C. However, after adding CM flux therein, the microstructure of T-BZN is much denser and the grain size is about 2, Ltm, as shown in FIG. 9.

Figure 12:
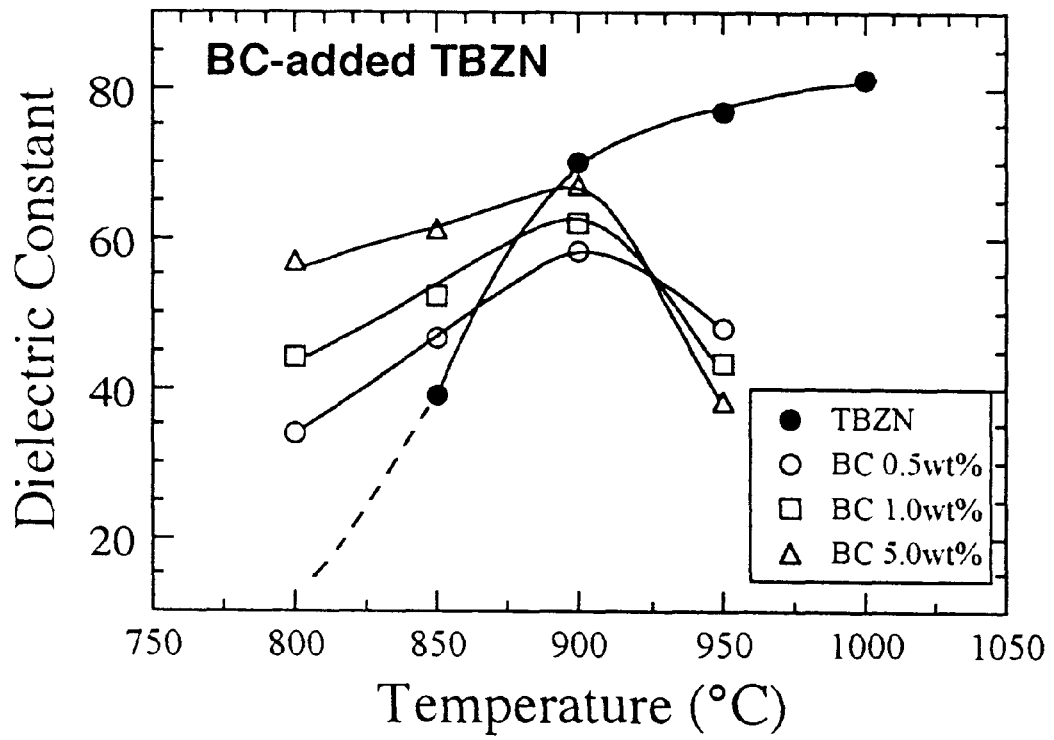
FIG. 12 is a plot showing the dielectric constant at 3 GHz versus sintering temperature for T-BZN added with different amount of $BaCO_3$—2.5CuO (BC)
Figure 13:
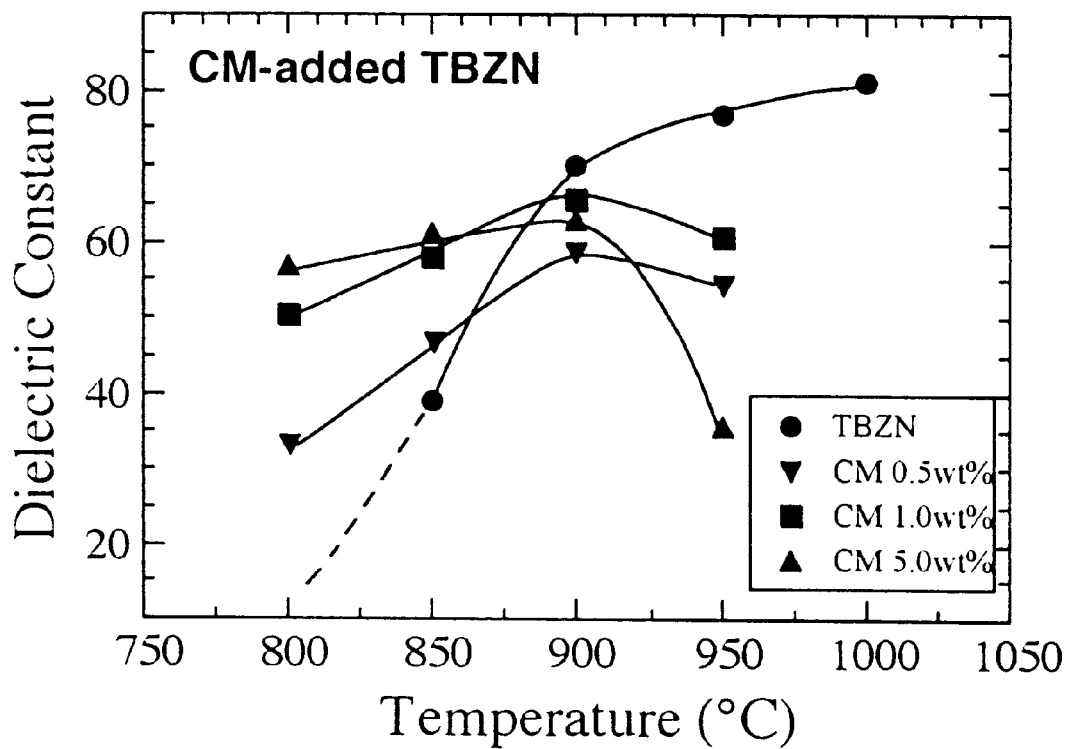
FIG. 13 is a plot showing the dielectric constant at 3 GHz versus sintering temperature for T-BZN added with different amount of 0.15CuO—$0.85MoO_3$ (CM)

The effect of CuO—$BaCO_3$ (BC) and CuO—$MoO_3$ (CM) on the low-temperature microwave dielectric properties of T-BZN are shown in FIGS. 10~13. When the amount of BC additive is 0.5 wt %, the largest Q factor is shown at 900° C. and is similar to that without BC addition (shown in FIG. 10). In addition, since pure T-BZN can not be densified below 850° C., Q factor will not be detected at 800° C. However, when 0.5~1.0 wt % of BC is added, the Q factor of T-BZN ceramics is about 1000~1200 ($f$=3.5 GHz) at 800° C. However, when the added amount of BC flux increased above 2.0 wt %, Q factor will be decreased. On the other hand, the addition of CM flux exhibits a better improving effect on the microwave properties of T-BZN, especially for low-temperature sintering. When the T-BZN ceramics added with 1.0 wt % and sintered at 800~850° C., the Q factor of T-BZN (FIG. 11) can be correspondent with that of pure T-BZN at 950° C. The Q factor is lowered just with increasing CM flux above 2.0 wt %. FIGS. 12 and 13 show that the dependence of dielectric constant on sintering temperature for BZN ceramics for different amount of BC and CM additives, respectively. For pure T-BZN, the dielectric constant is 70~80 when sintered at 900~950° C. but a lower dielectric constant is observed below 850° C. However, with BC or CM additive, a higher dielectric constant can be achieved at a very low sintering temperature. As an example, when the sintering temperature is 800° C., the dielectric constant of T-BZN is about 47 with 1.0 wt % BC additive and about 50 with 1.0 wt % CM additive. In addition, the dielectric constant increases with sintering temperature up to 900° C., but if the added amount of fluxes is too much, the dielectric constant will be lowered when the sintering temperature is above 900° C.

Figure 14:
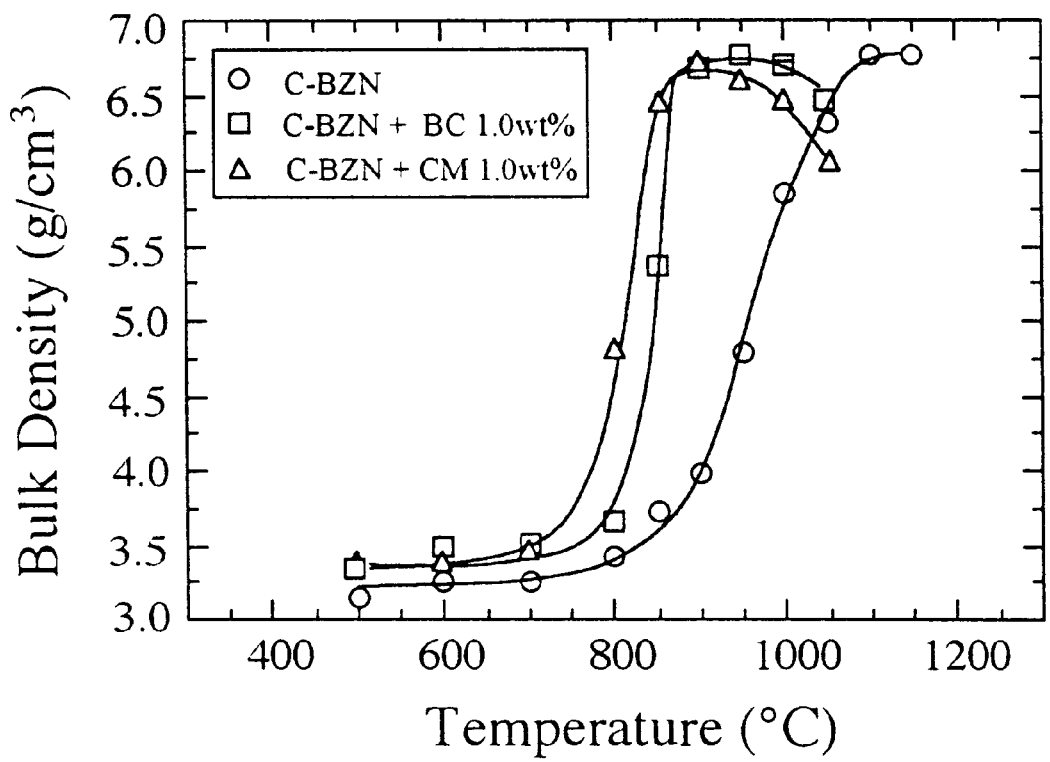
FIG. 14 is a plot showing the effect of 1 wt % BC or CM flux on bulk density of the stoichiometric $Bi_{4/3}(Zn_{2/3}Nb_{4/3})O_6$ composition (called C-BZN)

For comparison, the influence of BC and CM on other $Bi_2O_3$—ZnO—$Nb_2O_5$-based ceramics such as $Bi_{4/3}(Zn_{2/3}Nb_{4/3})O_6$ (so called C-BZN) is also discussed. As shown in FIG. 14, the addition of CM will lower the sintering temperature of C-BZN from 1100° C. to 850° C. and excellent microwave dielectric properties are still maintained.

Figure 15:
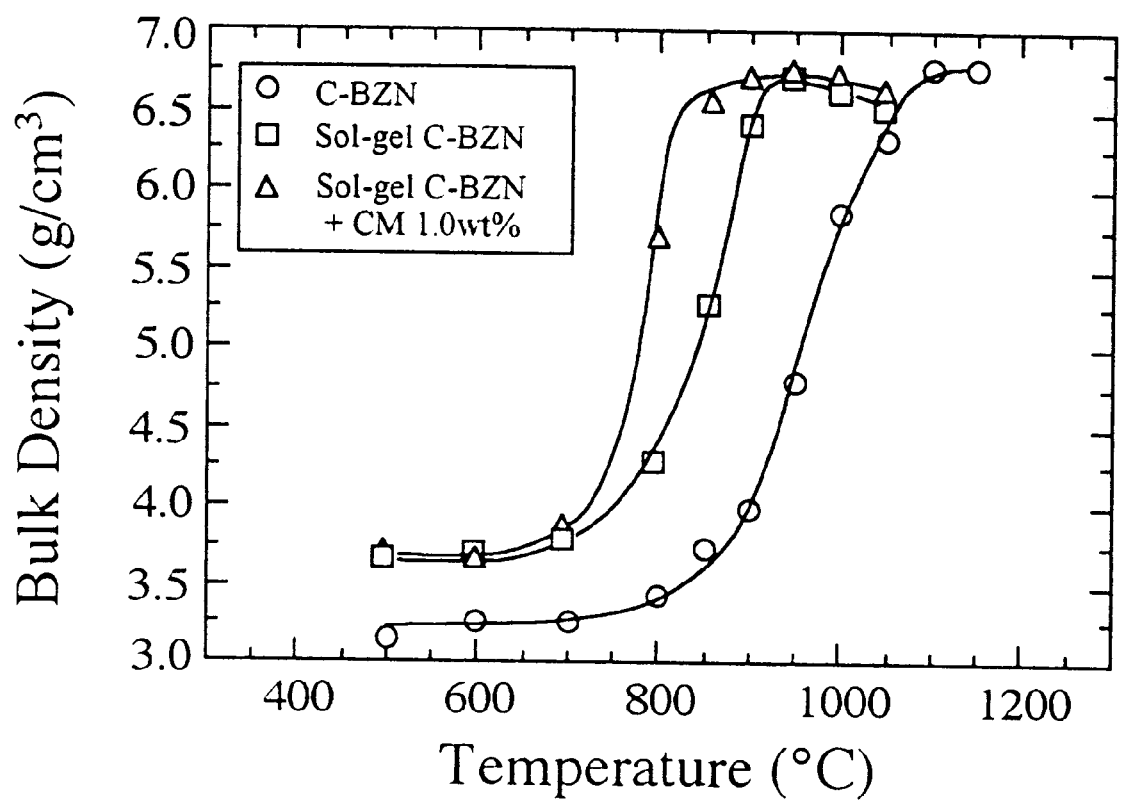
FIG. 15 is a plot showing the effect of 1 wt % CM flux on bulk density of sol-gel C-BZN powder.

FIG. 15 is a density-to-temperature diagram of C-BZN formed by different kinds of method: (1) C-BZN formed by oxides powder synthetic method, (2) C-BZN formed by sol-gel method, and (3) C-BZN formed by sol-gel method and added with 1.0 wt % CM. The raw precursors of sol-gel method are $Bi(CH_3COO)_3$, $Zn(CH_3COO)_2$, and $Nb(OC_2H_5)_5$. It is shown that the sintering temperature of pure C-BZN can be reduced from 1100° C. to 900° C. with the C-BZN powder synthesized by sol-gel method. Additionally, if the sol-gel C-BZN powder was added with 1.0 wt % CM, the sintering temperature will be further lowered to 800~850° C.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A dielectric ceramic material comprising:
   a mixture represented by the formula of $Bi_{2-x}(Zn_{2/3}Nb_{4/3})O_{7-3x/2}$(BZN), $0 \leq x \geq 0.67$; and
   an eutectic flux being one of $BaCO_3$—2.5CuO and 0.15CuO—0.85$MoO_3$ for lowering the sintering temperature of said mixture from 950~1100° C. to 800~850° C.;
   wherein said dielectric material has a dielectric constant larger than 45 ($\in$>45) and a quality factor larger than 1200 (Q f>4500) at 3.5 GHz.

2. The dielectric material according to claim 1, wherein said flux is $BaCO_3$—2.5CuO mixture powder formed at 1200° C.

3. The dielectric material according to claim 1, wherein said flux is 0.15CuO—0.85$MoO_3$ powder formed at 900° C.

4. The dielectric material according to claim 1, wherein said flux is added into said mixture with an amount of 0.1~10 wt %.

5. The dielectric material according to claim 1, wherein said flux is added into said mixture with an amount of 0.5~5 wt %.

6. The dielectric material according to claim 1, wherein said mixture is formed from $Bi_2O_3$, ZnO, $Nb_2O_5$ calcined at 850° C.

7. The dielectric material according to claim 1, wherein said mixture is formed from $Bi(CH_3COO)_3$, $Zn(CH_3COO)_2$, and $Nb(OC_2H_5)_5$ by a sol-gel method.

* * * * *